Jan. 11, 1944. E. T. J. TAPP 2,339,205
STEERING ARRANGEMENT FOR MOTOR ROAD VEHICLES
Filed Sept. 5, 1941 2 Sheets-Sheet 2
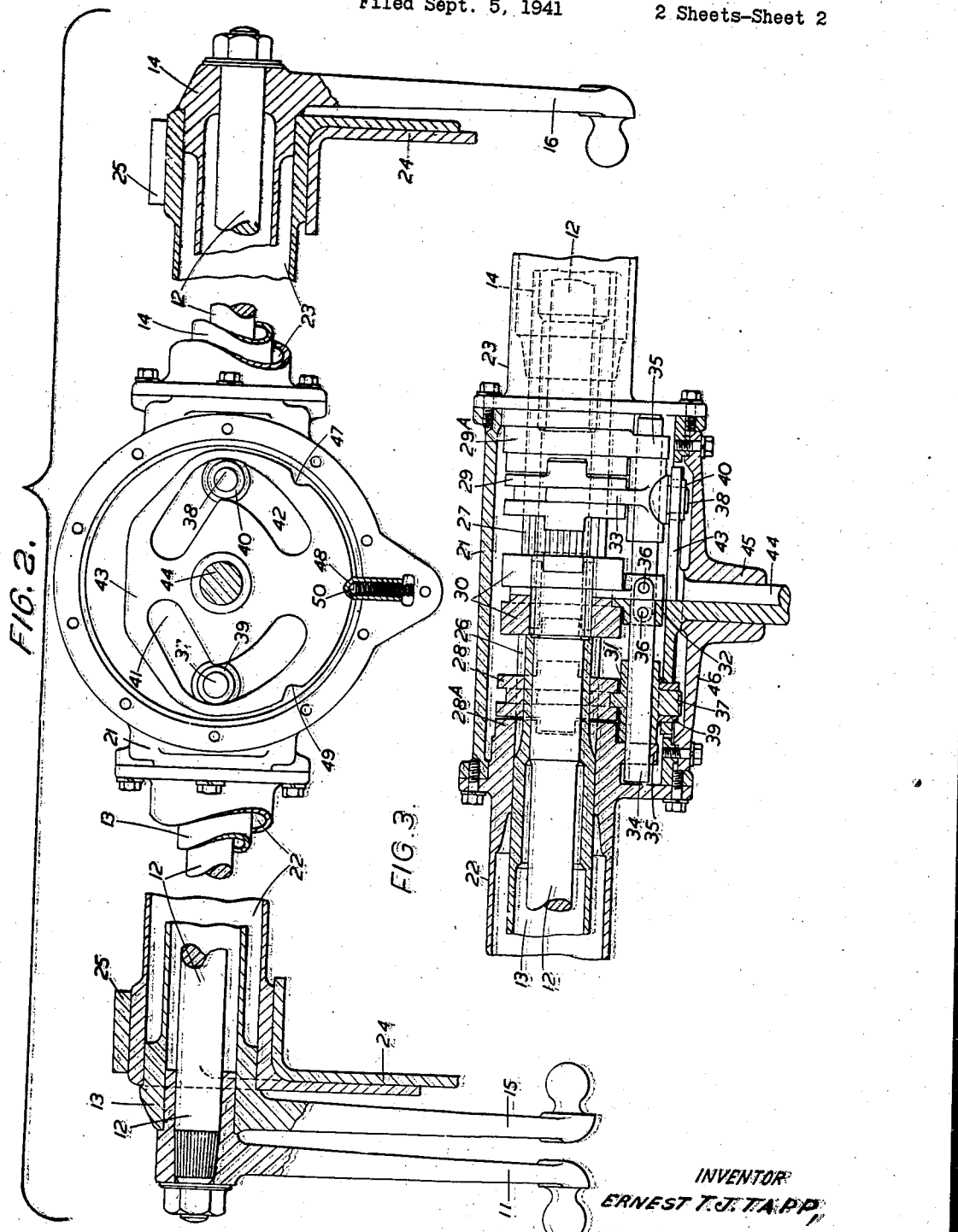
INVENTOR
ERNEST T. J. TAPP
BY
William C. Linton
ATTORNEY Patented Jan. 11, 1944

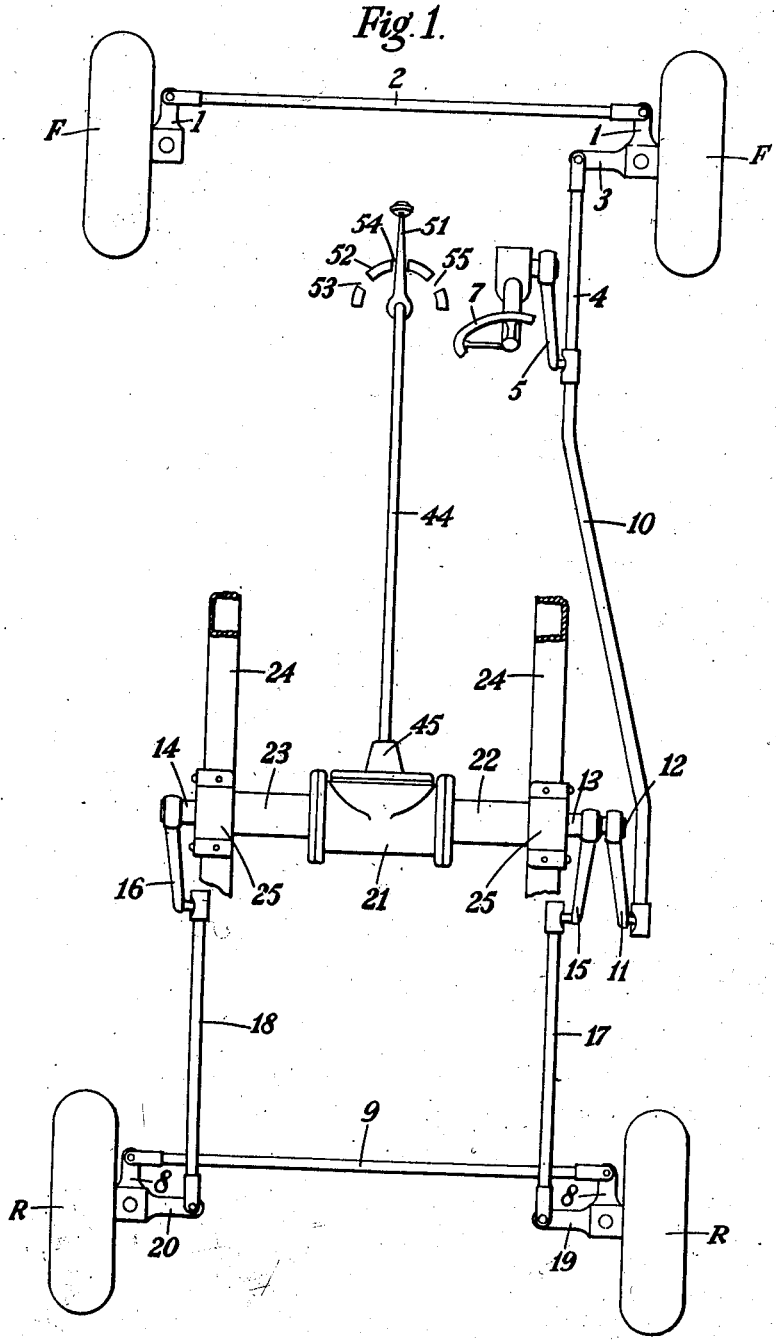

2,339,205

UNITED STATES PATENT OFFICE 2,339,205

STEERING ARRANGEMENT FOR MOTOR ROAD VEHICLES

Ernest Thomas James Tapp, London, England

Application September 5, 1941, Serial No. 409,743
In Great Britain May 10, 1940

8 Claims. (Cl. 280—91)

This invention relates to road vehicles of the type steered by more than one pair of wheels, and has particular reference to vehicles designed to afford at will either normal steering with two wheels only with the other wheels fixed parallel to the centre line of the chassis, steering wherein the rear wheels are caused to follow the track of the front wheels, or steering wherein the vehicle is caused to follow a parallel movement, that is to say, all the wheels turning but remaining approximately parallel to one another.

A road vehicle of the above type is often provided with two axles of the Ackerman type having deflectable stub axle extremities, one of such axles being connected directly with a steering box in the normal manner and thus being steerable at all times and the other axle being operatively connected to the steering box through means which are selectively engageable in accordance with the movement it is desired to impart to the wheels carried by it, and the present invention has for its object to provide an improved construction of such steering arrangements.

According to the invention one axle of a vehicle of the type referred to has normal steering connections, that is to say, a single steering arm linked to a steering box drop arm, and the other axle is fitted with two steering arms coupled respectively to independent drop arms: and connections and mechanism are provided, firstly, whereby both said independent drop arms can be caused to be held against angular movement, and, secondly, whereby either one of said independent drop arms can be coupled operatively to the normal vehicle steering gear; for the purpose of imparting to the vehicle steering control which is variable to enable a vehicle to be steered according to either one of the three alternative manners indicated above.

To this end, the front axle, preferably, is coupled directly to a steering box by a link and drop arm in the conventional manner, and each of the stub axles of the rear axle is fitted with a steering arm linked to one of a pair of drop arms mounted on the chassis on a common axis in such a manner as to be capable, alternatively, of being interlocked with fixed abutments or with one another, or of having angular movement imparted to the one or the other, according to steering requirements.

The invention is illustrated by way of example in the accompanying drawings, in which Fig. 1 is a diagrammatic plan view, illustrating the layout of the vehicle steering connections;

Fig. 2 is a sectional elevation looking toward the front of the clutch box assembly and casing supporting the rear axle drop arms, the front cover plate of the clutch box being removed in order to expose to view the clutch-actuating cam.

Fig. 3 is a sectional plan view of the clutch box assembly and parts of the casing supporting the rear axle drop arms.

Referring firstly to Figure 1, F, F, represent the front wheels of a vehicle of which the steering arms 1, 1, are coupled by a steering tie rod 2, and an arm 3 is connected by a steering link 4 and drop arm 5 to a steering box 6 controlled by a steering handwheel 7 in conventional manner.

R, R, represent the rear wheels of the vehicle which are mounted pivotally on stub axles which are provided with steering arms 8, 8, connected by a steering tie rod 9.

The steering link 4 has a rearward prolongation 10 coupled to a drop arm 11 mounted on a rock shaft 12 journalled concentrically within a pair of tubular angularly movable half-shafts 13, 14, carrying at their outer ends drop arms 15 and 16 respectively, these drops arms 15, 16, being coupled by links 17 and 18 to steering arms 19 and 20 projecting from the respective stub axles of the rear wheels R, R.

The tubular half-shafts 13 and 14 are mounted within a tubular housing disposed transversely of the vehicle chassis and comprising a central flanged cylindrical clutch box 21 and a pair of laterally extending flanged tubular casings 22, 23, bolted thereto and held on the longitudinal members 24, 24, of the chassis by clamps 25, 25. The casing 22 is secured against rotation, but to eliminate torsional stresses due to chassis distortion, the casing 23 is preferably permitted a small amount of angular movement in its clamp. At its inner end each tubular half-shaft 13 and 14 is splined externally at 26, 27, and splined slidably on said tubular half-shafts are double dog-clutch members 28, 29, respectively, while a mating double dog-clutch member 30 is fixed on the rock shaft 12 intermediately of said members 28, 29. Mating fixed abutments 28A, 29A, are formed integrally with the flanged inner ends of the tubular casings 22, 23.

The clutch members 28, 29 and 30 are grooved peripherally to receive actuating forks 31, 32 and 33, respectively, whereof the forks 31 and 33 are slidably mounted upon a rod 34 fixed in brackets 35, 35, integral with the casing 21, and the fork 32 is pinned at 36, 36, centrally of the length of the rod 34.

The forks 31 and 33 are provided integrally with spigots 37, 38, respectively, carrying rollers 39, 40, which project into divergent cam slots 41, 42, formed in a plate 43 carried on the inner end of an operating shaft 44 supported in a boss 45 integral with a cover plate 46 for the casing 21; the periphery of the plate 43 being furnished with three spaced notches 47, 48, 49, adapted according to the angular position of the plate 43 to receive the nose of a spring-pressed plunger 50 mounted in the casing 21. One limb of each cam slot 41, 42, is slightly curved and the other is straight.

At its forward end the operating shaft 44 is connected suitably to a clutch-operating lever 51 adapted to be moved angularly with respect to an arcuate control member 52 formed with three slots 53, 54, 55, complementary to the notches 47, 48, 49, in the periphery of the plate 43 and serving to hold the lever 51 in whichever of three positions of adjustment it may be moved.

In the position in which the parts are shown in the drawings the control lever is set for normal front wheel steering only, for which purpose the rear-axle drop arms 15 and 16 are locked against movement by the engagement of the outer faces of the clutch members 28, 29, with the fixed abutments 28A, 29A, the drop arm 11 being free to move idly.

When it is desired to steer the vehicle by causing the rear wheels to follow the track of the front wheels, the control lever 51 is moved from its present position in slot 54 into slot 53 of the arcuate controlling member the effect of which is to impart to the cam plate 43 angular movement in a clockwise direction (as seen in Figure 2) until the nose of the spring-loaded plunger 50 is engaged by the peripheral notch 47, thus bringing the roller 39 on fork 31 into the curved limb of the slot 41 and the roller 40 on fork 33 into the straight limb of the slot 42 thereby sliding the dog-clutch 28 out of engagement with the abutment 28A into a neutral position and disengaging the dog-clutch 29 from the abutment 29A and moving it into engagement with the mating unit 30 fixed on rockshaft 12. When therefore the steering wheel 7 is moved to steer the vehicle in the desired direction, the angular steering movement imparted to the front wheels, F, F, is transmitted inversely to the rear wheels R, R, through the medium of the link 10, drop arm 11, rockshaft 12, clutch members 29, 30, tubular shaft 14, drop arm 16, and link 18 to steering arm 20, the drop arm 16 therefore moving in unison with the drop arm 5 and the drop arm 15 idling.

When it is desired to steer the vehicle in such manner that it is caused to follow a parallel movement, that is to say, all the wheels turning but remaining approximately parallel to one another, the control lever 51 is moved into the slot 55 in the arcuate controlling member 52, the effect of which is to impart to the cam plate 43 angular movement in a counter-clockwise direction (as seen in Figure 2) until the nose of the spring-loaded plunger 50 is engaged by the peripheral notch 49 in the plate, thus bringing the roller 39 on fork 31 into the straight limb of the cam slot 41 and the roller 40 on fork 35 into the curved limb of the cam slot 42 thereby sliding clutch member 29 out of engagement with the abutment 29A into a neutral position and clutch member 28 out of engagement with abutment 28A into engagement with the mating unit 30. Thus, when the steering wheel 7 is moved to steer the vehicle in the desired direction, the angular steering movement imparted to the front wheels F, F, is transmitted correspondingly to the rear wheels R, R, through the medium of link 10, drop arm 11, rockshaft 12, clutch members 28, 30, tubular shaft 13, drop arm 15, and link 17 to steering arm 19, the drop arm 15 moving in unison with the drop arm 5 and the drop arm 16 idling.

It has been stated above that the two rear axle drop arms 15, 16, never become completely disengaged simultaneously and this is ensured by so contouring the cam slots 41, 42, in plate 43 that engagement between either clutch member 28 or 29 with the mating member 30 is effected slightly in advance of disengagement of member 29 or 28 from its fixed abutment 29A or 28A.

It may be desirable to permit the control hand lever to be moved into the desired position when the vehicle wheels are not parallel with the centre line of the chassis, and to this end flexible controlling means may be interposed between the hand lever and the aforesaid cam mechanism, for example by so proportioning a shaft connecting the hand lever with the cam mechanism that the shaft is resilient in torsion, the dog clutches in such a case moving under the influence of the flexible control to the required position when the vehicle wheels become parallel with the vehicle centre line.

In a case in which the steering mechanism of this invention is to be applied to a vehicle having more than four wheels, the controls carried by the clutch box and its associated casings may be linked to one or more axles in known manner.

Instead of being mounted above the longitudinal members of the chassis, the clutch box and associated casings may in some cases be arranged below and in other cases arranged between the longitudinal members, and the disposition of and connections between the drop arms may be varied as may be necessary.

What I claim is:

1. In a road vehicle of the type steered by a plurality of pairs of road wheels, a front axle carrying pivotally a pair of road wheels coupled directly to a steering box by a link and drop arm in conventional manner, a second axle carrying pivotally a pair of road wheels articulated together, a pair of drop arms respectively coupled to said second mentioned pair of road wheels, angularly movable shafts having a common axis and supporting said pair of drop arms, clutch elements slidable upon said angularly movable shafts, a rockshaft disposed concentrically of said angularly movable shafts, a clutch element carried fixedly by said rockshaft intermediately of said slidable clutch elements, stationary abutments for engagement by said slidable clutch elements, a drop arm secured to said rockshaft, a link coupling said last mentioned drop arm to said steering box drop arm, means for positioning said slidable clutch elements, and controlling means for manipulating said positioning means and controlling the clutch elements to hold the angularly movable shafts against movement and allow the rock shaft to have idling movement, whereby the front wheels may be independently steered, or to free one of said angularly movable shafts for idling movement and couple the other angularly movable shaft to the rock shaft for movement therewith and actuation thereby, whereby when the front wheels are turned in a desired direction inverse motion will be transmitted to the rear wheels, or to free the second named angularly movable shaft for idling movement and couple the first named angularly movable shaft to the rock shaft for movement therewith and actuation thereby, whereby when the front wheels are turned in a desired direction corresponding motion will be transmitted to the rear wheels.

2. In a road vehicle of the type steered by a plurality of pairs of road wheels, a front axle carrying pivotally a pair of road wheels coupled directly to a steering box by a link and drop arm in conventional manner, a second axle having pivoted thereon a pair of stub axles carrying a pair of road wheels, said stub axles being articulated together and each being furnished with a forwardly extending steering arm, a pair of drop arms respectively coupled to said forwardly extending steering arms, angularly movable tubular shafts having a common axis and supporting said pair of drop arms, clutch elements slidable on said angularly movable tubular shafts, a transverse rockshaft arranged concentrically of said angularly movable tubular shafts, a clutch element secured fixedly upon said transverse rockshaft intermediately of said slidable clutch elements, fixed abutments for engagement by said slidable clutch elements to hold the angularly movable shafts from movement, a drop arm secured to said transverse rockshaft, a link coupling said last mentioned drop arm to said steering box drop arm, means for positioning said slidable clutch elements to couple either angularly movable shaft to the rock shaft and free the other angularly movable shaft for idling movement, and controlling means for manipulating said positioning means.

3. In a vehicle of the type steered by a plurality of pairs of road wheels, a front axle carrying pivotally a pair of road wheels coupled directly to a steering box by a link and drop arm in conventional manner, a second axle having pivoted thereon a pair of stub axles carrying a pair of road wheels, said stub axles being articulated together and each being furnished with a forwardly extending steering arm, a pair of drop arms respectively coupled to said forwardly extending steering arms, angularly movable tubular shafts having a common axis and supporting said pair of drop arms, opposed double dog-clutch members slidable axially on said angularly movable tubular shafts, said clutch members comprising outwardly projecting dogs and inwardly projecting dogs, a transverse rockshaft arranged concentrically of said angular movable tubular shafts, an intermediate double dog-clutch member secured fixedly upon said transverse rockshaft for engagement selectively with said inwardly projecting dogs on said opposed double dog-clutch members, fixed abutments for engagement selectively by said outwardly projecting dogs on said double dog-clutch members to normally hold the angularly movable shafts from movement, a drop arm secured to said transverse rockshaft, a link coupling said last mentioned drop arm to said steering box drop arm, cam means for positioning said slidable double dog-clutch members to couple either angularly movable shaft to the rock shaft and free the other angularly movable shaft for idling movement, a rod actuatably connected to said cam means, and hand controlling means for manipulating said cam means.

4. A road vehicle of the type steered by a plurality of pairs of wheels, as claimed in claim 3, wherein the arrangement of said dog-clutch and mating dogs is such that engagement can be effected only in one angular position wherein the vehicle wheels are parallel with the centre line of the vehicle.

5. A road vehicle of the type steered by a plurality of pairs of wheels, as claimed in claim 3, wherein the axial movement resulting in the engagement of said dog-clutch members is so controlled that the dogs on said two tubular members are never disengaged simultaneously.

6. A road vehicle of the type steered by a plurality of pairs of wheels, as claimed in claim 3, wherein the axial movement of said dog-clutch members is effected by a rotatable cam.

7. A road vehicle of the type steered by a plurality of pairs of wheels, as claimed in claim 3, wherein the axial movement of said dog-clutch members is effected by a rotatable cam and said rotatable cam is actuated by a shaft which is torsionally elastic intermediately of said cam and an operating hand control member.

8. A road vehicle of the type steered by a plurality of pairs of road wheels, including a front wheel steering box supporting a drop arm, a steering link extending from said drop arm to a front pair of road wheels, a rear pair of road wheels mounted steerably on a rear axle, a rockshaft disposed intermediately of said front and rear road wheels, a drop arm carried by said rockshaft, a prolongation of said steering link coupled to said drop arm, tubular angularly movable half-shafts surrounding said rockshaft, each half-shaft having a drop arm secured to it, steering links coupling said last mentioned drop arms respectively with said steerable rear wheels, clutch members splined slidably on said tubular half-shafts, a fixed clutch member intermediate said half-shafts and carried by said rockshaft, fixed clutch abutments disposed outwardly of said splined clutch members and normally engaged thereby to hold said clutch members in neutral position and the angularly movable shafts out of coupling engagement with the rock shaft, cam clutch-actuating means and an actuating rod therefor, a clutch operating hand lever connected to said actuating rod, whereby the movable clutches may be operated to couple either angularly movable shaft to the rock shaft and to free the other angularly movable shaft for idling movement, and a control member engageable by said hand lever to hold the same temporarily in a control position.

ERNEST THOMAS JAMES TAPP.